_(12)_ United States Patent
Walma et al.

(10) Patent No.: US 9,192,028 B2
(45) Date of Patent: Nov. 17, 2015

(54) SYSTEMS AND METHODS FOR SELF COMMISSIONING AND LOCATING LIGHTING SYSTEM

(71) Applicants: Kenneth Walma, Peachtree City, GA (US); James Moan, Peachtree City, GA (US)

(72) Inventors: Kenneth Walma, Peachtree City, GA (US); James Moan, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/215,758

(22) Filed: Mar. 17, 2014

(65) Prior Publication Data

US 2014/0265870 A1  Sep. 18, 2014

Related U.S. Application Data

(60) Provisional application No. 61/792,072, filed on Mar. 15, 2013.

(51) Int. Cl.
*H05B 37/02* (2006.01)

(52) U.S. Cl.
CPC ........ *H05B 37/0245* (2013.01); *H05B 37/0218* (2013.01); *H05B 37/0227* (2013.01)

(58) Field of Classification Search
CPC ............................ H05B 37/02; H05B 37/0245
USPC ......................................... 315/151, 291, 297
See application file for complete search history.

(56) References Cited

U.S. PATENT DOCUMENTS

| 8,208,818 B2 | 6/2012 | Sasai | |
|---|---|---|---|
| 8,829,821 B2* | 9/2014 | Chobot et al. | 315/312 |
| 2008/0218087 A1* | 9/2008 | Crouse et al. | 315/131 |

FOREIGN PATENT DOCUMENTS

| WO | WO 2008104927 | 4/2008 |
|---|---|---|
| WO | WO 2009133489 | 5/2009 |
| WO | WO 2010086757 | 5/2010 |

OTHER PUBLICATIONS

LED's Magazine; "Use of Controls escalates in LED lighting despite lack of standards," Feb. 2012.
International Search Report for PCT/US2014/030291, mailed Sep. 25, 2014.

* cited by examiner

*Primary Examiner* — Tung X Le
*Assistant Examiner* — Raymond R Chai
(74) *Attorney, Agent, or Firm* — King & Spalding LLP

(57) ABSTRACT

The present disclosure provides techniques for a self-commissioning and locating lighting system. The system includes a group of light fixtures, each emitting a unique optical data signal. A remote control device detects the unique optical data signal from the light fixtures when the light fixture is within a visual field of the remote control device. A central controller receives a signal from the remote control device, wherein the signal comprises data regarding the GPS location of the remote control device and the digital identities of the light fixture within the visual field of the remote control, wherein the signal further comprises a control command for operation of the light fixtures, and wherein the central controller sends a control signal to the light fixture implementing the control command.

19 Claims, 3 Drawing Sheets

SYSTEMS AND METHODS FOR SELF COMMISSIONING AND LOCATING LIGHTING SYSTEM

CROSS-REFERENCE TO RELATED APPLICATIONS

This application claims priority under 35 U.S.C. §119 to U.S. Provisional Patent Application No. 61/792,072 titled "Systems and Methods for Self Commissioning and Locating Lighting System" filed on Mar. 15, 2013, the entirety of which is incorporated by reference herein.

TECHNICAL FIELD

The present disclosure relates to intelligent lighting systems. Specifically, the present disclosure relates to a self-commissioning lighting system with occupancy sensitivity and auto-locating capabilities.

BACKGROUND

Low cost microprocessors and electronics have enabled the increased granularity of control systems in lighting and energy management controls. Whereas lighting systems have utilized a central panel with breaker or relay controls to switch or dim a circuit of lighting, today's systems are incorporating smart, solid state lighting fixtures, sensors, keypads, and a plethora of other devices. As systems have moved from a centralized control methodology, to an addressable topology, the number of devices in a system as increased dramatically. In large systems, as many as 30,000 digital, addressable devices may be present in one building's lighting or energy management system.

In order to properly program these systems, a commissioning agent must first "address" or associate the digital address to the physical location of these devices. This can be done via a visual/optical method, such as flashing an LED or the light fixture to signify a particular digital address corresponds with a certain device in a particular location. This can also be completed by a physical method of pushing a button on the device or reading an RF ID tag out of the device and associating that signal with a map of the floor plan. In all of these circumstances, this commissioning process can be time consuming and complicated.

SUMMARY

According to an aspect of the present disclosure, a self-commissioning lighting system comprises a central controller, a first light fixture, and a second light fixture. The first light fixture comprises a first processor communicatively coupled to the central controller, a first light source coupled to the first processor and emitting a first optical data signal, and a first ambient light sensor coupled to the first processor and configured to detect a second optical data signal. The second light fixture comprises a second processor communicatively coupled to the central controller, a second light source coupled to the second processor and emitting the second optical data signal, wherein the second optical data signal is distinct from the first optical data signal, and a second ambient light sensor coupled to the second processor and configured to detect the first optical data signal. The self-commissioning lighting system further comprises a remote device, such as a mobile device, communicatively coupled to the central controller, and comprising a remote ambient light sensor, wherein the ambient light sensor is configured to detect the first and second optical data signals.

According to another aspect of the present disclosure, a system of controlling a self-commissioned lighting system comprises a group of light fixtures, wherein each light fixture in the group of light fixtures emits a unique optical data signal indicative of the digital identity of the emitting light fixture. The system also includes a remote control device, such as a mobile device, comprising an ambient light sensor and a GPS device, wherein the ambient light sensor detects the unique optical data signal of a light fixture in the group of light fixtures if the light fixture is within a visual field of the remote control device. The system further includes a central controller. The central controller receives a signal from the remote control device, wherein the signal comprises data regarding the GPS location of the remote control device and the digital identities of the light fixture within the visual field of the remote control. The signal further comprises a control command for operation of the light fixtures, and the central controller sends a control signal to the light fixture implementing the control command.

According to another aspect of the present disclosure, a method of self-commissioning a lighting system comprises defining a visual group within a system of light fixtures, the system of lighting comprising a plurality of light fixtures, defining an occupancy grouping within the system of light fixtures, defining a physical location of each light fixture in the system of light fixtures, and controlling the system of light fixtures according to visual grouping, occupancy grouping, and/or location.

The foregoing discussion of example embodiments is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE FIGURES

Reference will now be made to the accompanying drawings, which are not necessarily drawn to scale, and wherein.

Figure 1:
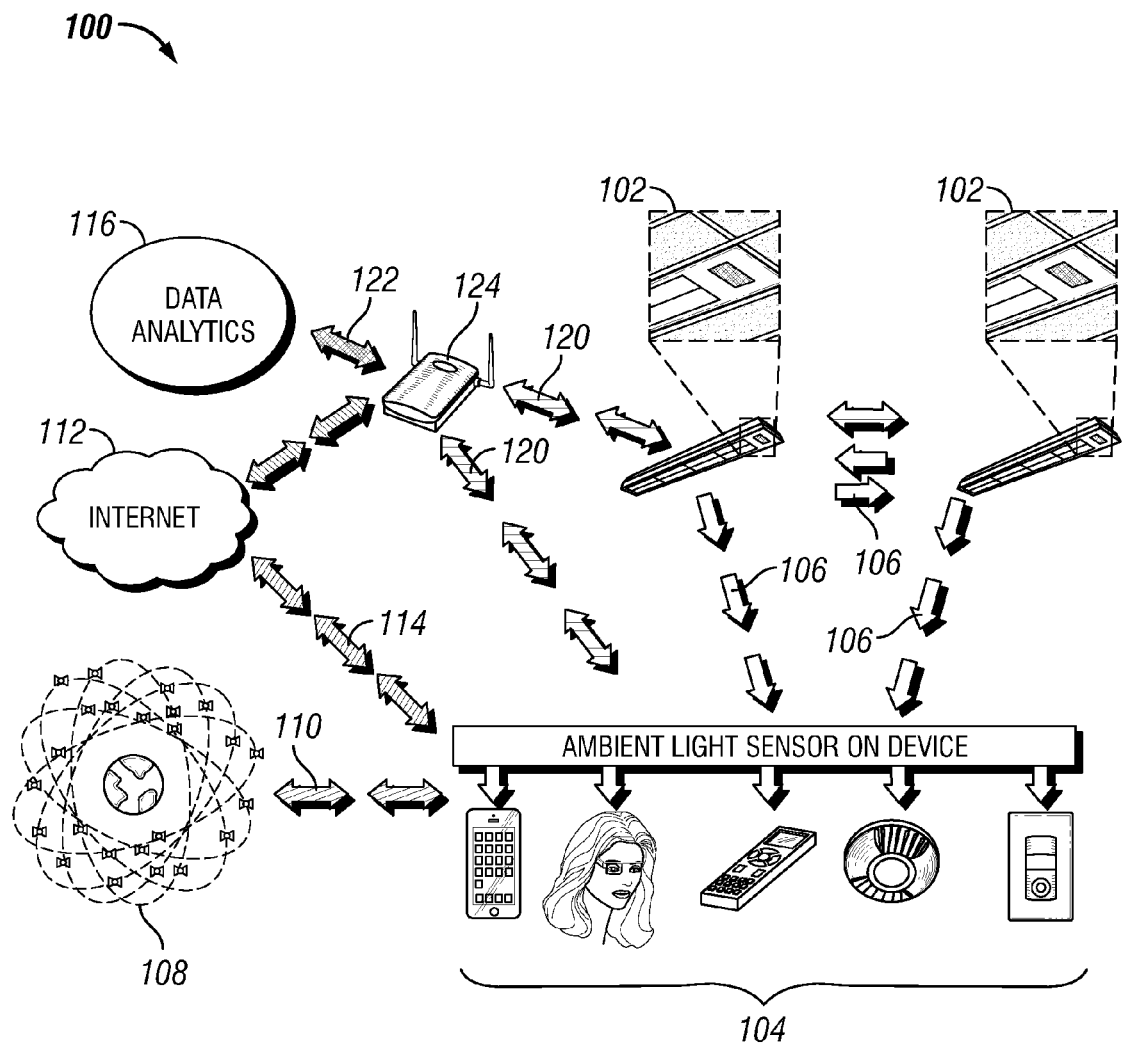
FIG. 1 is diagrammatical illustration of a network for a self-commissioning lighting system, in accordance with example embodiments of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of the example

DETAILED DESCRIPTION OF EXAMPLE EMBODIMENTS

Example embodiments disclosed herein are directed to systems and methods for intelligently self-commissioning, grouping, and controlling a lighting system having a plurality of lighting devices. Example embodiments disclosed herein are also directed to systems and methods of controlling a group of lighting devices remotely from a mobile device based on location. The example embodiments provide the ability to dynamically and automatically group and identify individual lighting devices or lighting devices within a lighting system by sensing physical location, relative location, and usage patterns over time. Thus, the system is capable of increasing control efficiency as well as automatically adapting to usage changes as more data is collected over time. The example embodiments make reference to light fixtures, mobile devices, and various types of data transmission technologies, which are provided as examples only. The light fixture can include a wide range of lighting device types and applications. Likewise, in certain embodiments, the mobile devices could be any number of devices with processing means, such as, but not limited to, a cellular telephone, a handheld controller, a computer, a stationary controller, a wearable device, any combination thereof, and the like. The example data transmission technologies may likewise be replaced or used in conjunction with other communication means.

A self-commissioning system uses a combination of data transmission technologies, data analytics, and a system of light fixtures, sensors, and devices, to allow the light fixtures to dynamically associate with each other and self-commission themselves by detecting and gradually learning usage patterns. Turning to the figures, FIG. 1 illustrates a network 100 for a self-commissioning lighting system in accordance with example embodiments of the present disclosure. The network 100 for a self-commissioning lighting system typically includes a plurality of lighting fixtures 102 and one or more mobile devices 104, in which the light fixtures 102 communicate with each other as well as with the mobile devices 104 through light data transmission signals 106. Specifically, the data transmission signal 106 emitted by each lighting fixture 102 contains a unique code identifying the digital identity of the respective emitting light fixture 102. The light data transmission signal 106 is detectable by any device programmed to detect such signals. Specifically, each light fixture 102 is capable of detecting the light data transmission signal 106 from the other light fixtures 102 within the system.

In certain example embodiments, even though the light fixtures 102 are capable of detecting light data transmission signals 106 from all other light fixtures 102 in the system, a particular light fixture may only pick up the light data transmission signal 106 from light fixtures 102 that are within a certain optical range. In order words, a light fixture 102 may only detect the data transmission signal 106 from light fixture 102 that it can "see". Thus, because the light data transmission signal 106 from each light fixture 102 contains a unique identifier associated with the sending light fixture 102, the light fixtures 102 in a system are able to detect which of the other light fixtures 102 are within a certain optical field, or area, of itself. Detecting which light fixtures 102 are within the same optical field or area contributes to the self-commissioning capabilities of the self-commissioning lighting system. Details of the self-commissioning lighting system 200 and its components are further illustrated in FIG. 2, and a detailed method of self-commissioning the lighting system is further illustrated in FIG. 3, both of which are discussed further below.

Turning again to FIG. 1, the mobile devices 104 are also able to receive and detect the light data transmission signal 106 from each light fixture 102 within an optical field or area, as well as decode and determine the identity of each light fixture 102 within the optical field or area from the unique identifier carried by each light data transmission signal 106. Thus, the mobile device 104 is able to detect which light fixtures 102 in the system are physically located close (e.g., visually available) to the current location of the mobile device 104. The mobile device 104, which includes global position capabilities, communicates with a GPS network 108 via a GPS communication channel 110 in order to obtain not only the physical location of the mobile device 104 itself, but an approximate physical location of the detected light fixtures 102 as well. This aids the self-commissioning process by automatically matching each light fixture 102, by its digital identity, to the physical location where it is located. Specifically, the GPS location of the mobile device 104 is transmitted to the internet 112 via a cellular communication signal 114, and then to a control-side router 124 via a wi-fi signal 118. The GPS location is then received by a central controller 116 via wired or wireless communication 122 from the router 124.

The central controller 116 generally governs the collective data processing and analytics of the system, including receiving data from the mobile devices 104 as well as the light fixtures 102 to assign grouping and physical location data to each light fixture. In certain example embodiments, the central controller 116 also controls the light fixtures according to the self-commissioned profiles. For example, the central controller 116 may be configured to synchronize and control the operation of all light fixtures within a certain area or visual group. In certain example embodiments, the light fixtures 102 and the mobile devices 104 are configured to communicate with the central controller 116 via a radio frequency channel such as via an RF 802.11 protocol.

Figure 2:
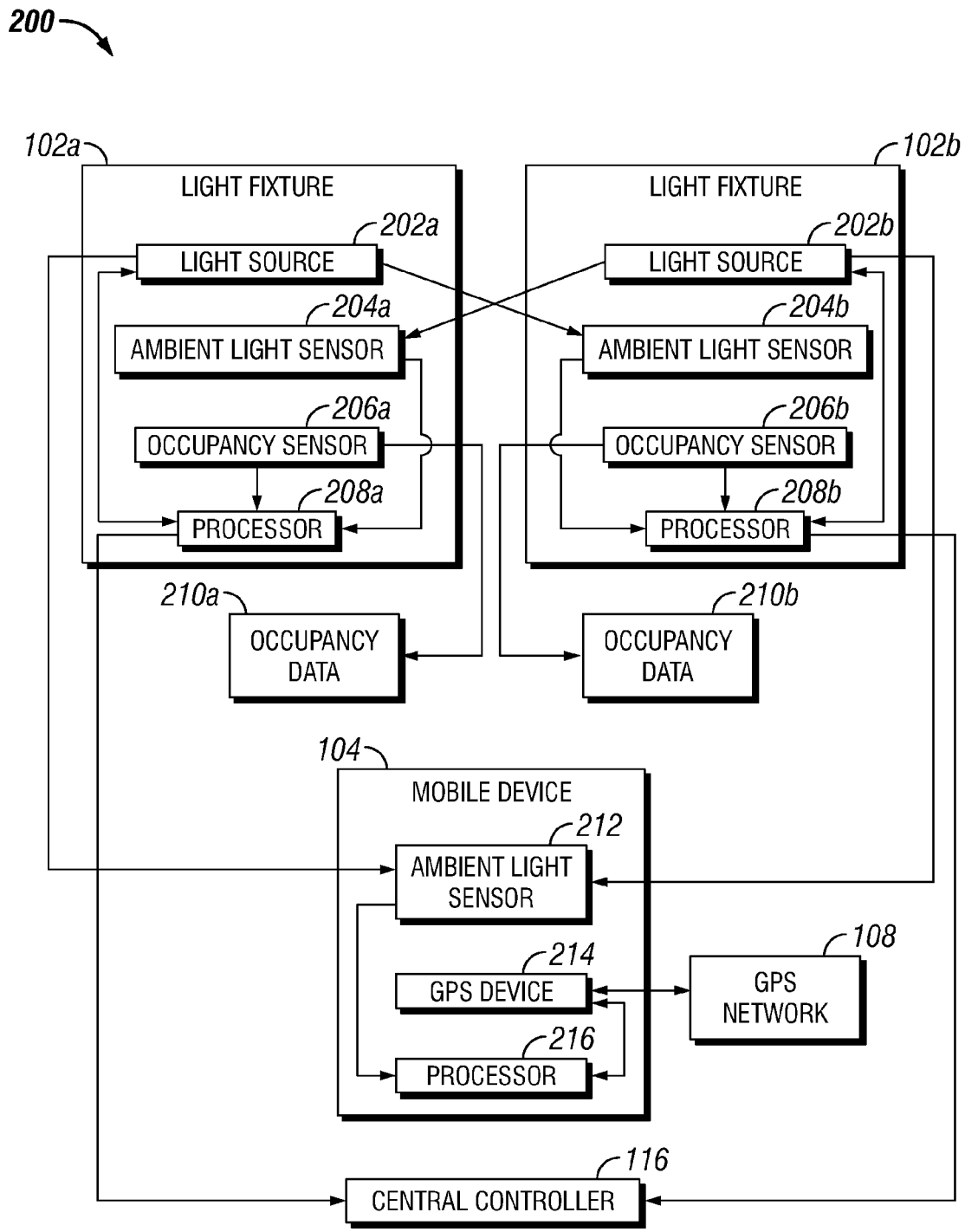
FIG. 2 is block diagram of a self-commissioning lighting system, in accordance with example embodiments of the present disclosure.

FIG. 2 illustrates a block diagram of the self-commissioning lighting system 200 in accordance with an example embodiment of the present disclosure. In an example embodiment, the self-commissioning system 200 includes at least a first light fixture 102a and a second light fixture 102b. In other example embodiments, the self-commissioning system 200 includes more than two light fixtures 102. The two light fixtures 102 shown herein are provided for illustrative purposes and their interaction could be replicated between additional light fixtures 102 in a system 200 having more light fixtures 102. Each of the light fixtures 102a, 102b includes a light source 202a, 202b, an ambient light sensor 204a, 204b, an occupancy sensor 206a, 206b, and a processor 208a, 208b. Each of the light sources 202 produce a light data transmission signal 106a, 106b which includes a unique identifier associated with the digital identity of the respective emitting light fixture 102. For example, the light source 202a of the first light fixture 102a emits a light data transmission signal 106a uniquely identifying the first light fixture 102a. In certain example embodiments, the light data transmission signal 106 may be coded as a unique pattern of high frequency light flickers that is not detectable to the eye. This light data transmission signal 106 is, however, detectable by the ambient light sensor 204b in the second light fixture 102b, given that the second light fixture 102b is within a visual field of the first light fixture 102a. Thus, the second light fixture 102b is aware that the first light fixture 102a is within the same visual field.

Specifically, the light data transmission signal 106a received by the ambient light sensor 204b is decoded by the processor 208b. The occupancy sensors 206a, 206b of each light fixture 102a, 102b are configured to detect occupancy data 210a, 210b in respective areas. The detected occupancy data 210, as well as data regarding the identified light fixtures within a certain visual field are sent to the central controller 116 for data synthesis and application.

In certain example embodiments, the self-commissioning system 200 includes the mobile device 104. The mobile device 104 further includes an ambient light sensor 212, a GPS component 214, and a processor 216. Thus, the light data transmission signals 106a, 106b from the first and second light fixtures 102a, 102b, are also received by the ambient light sensor 212 in the mobile device 104, given that the first and second light fixtures 102a, 102b are within a visual field of the mobile device 104. The GPS component 214 determines the location of the mobile device 104 by referencing the GPS network 108. Thus, the approximate location of the first and second light fixtures 102a, 102b is also determined and the information is sent to the central controller 116. Thus, the first and second light fixtures 102a, 102b are identified and commissioned.

Figure 3:
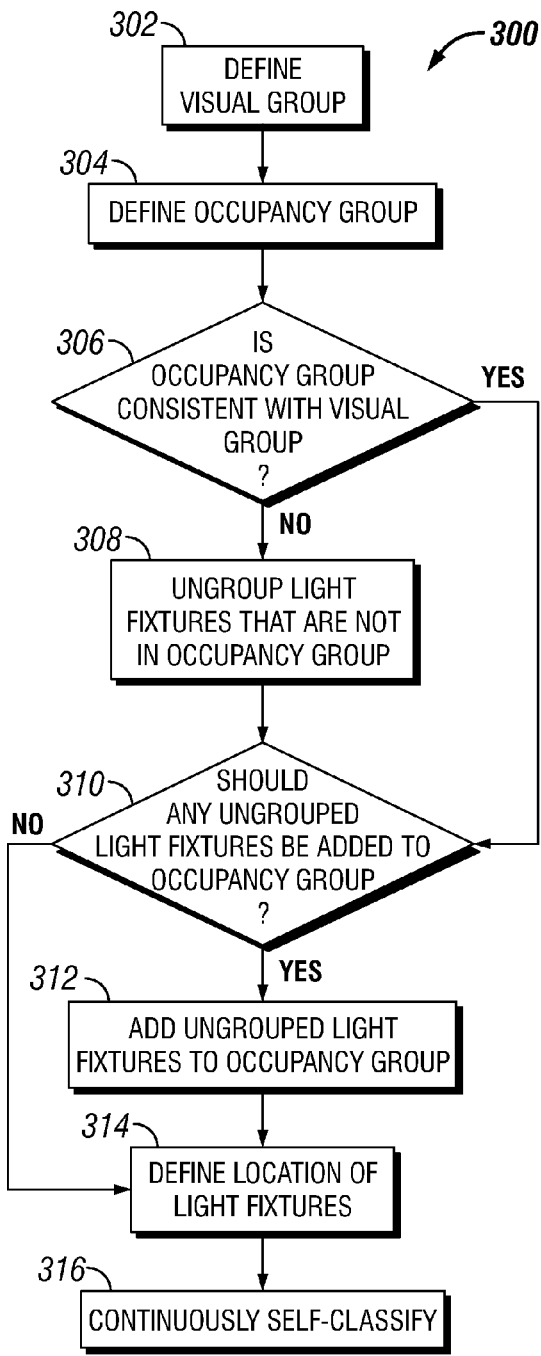
FIG. 3 is a process flow diagram of a method of self-commissioning a lighting system, in accordance with example embodiments of the present disclosure.

FIG. 3 illustrates a method 300 of self-commissioning a lighting system in accordance with an example embodiment of the present disclosure. In an example embodiment, a first step is defining one or more visual groups within the lighting system (step 302). The visual groups are defined as one or more light fixtures 102 that are within a visual field of one another, as determined by which light data transmission signals 106 are detected by each light fixture 102, as discussed above. The light fixture 102 in a certain group may be controlled similarly. In certain example embodiments, within certain visual groups, there may be sub-classifications. For example, a barrier group defines a group of light fixtures 102 whose visual field may contain temporary barriers such as doors. Such a group is classified and controlled accordingly. Then, the system defines occupancy groups (step 304). The light fixtures 102 in a certain occupancy group are grouped as such because they see similar or associated occupancy patterns. The occupancy patterns are typically synthesized from occupancy data detected by the occupancy sensors 206. For example, in certain embodiments, individual light fixtures 102 are classified into a number of occupancy classes, such as a walking path class, a stationary class, and a high traffic class, as light fixture 102 within the same occupancy class may be effective controlled together. Occupancy groups may be defined based on, or further enhanced by, the defined visual groups. However, upon analysis of occupancy data, in some cases, the light fixtures 102 defined in a single visual group may exhibit very different occupancy activity.

Thus, the system then determines whether or not the defined occupancy groups are consistent with the defined visual groups (step 306). If it is determined that the occupancy groups are not consistent with the visual groups, then any light fixture 102 that is not within a certain occupancy group is ungrouped (step 308). Then it is determined if there are any light fixtures 102 that should be in a certain group based on its occupancy data but was not determined to be apart of the visual group (step 310). If there are light fixtures 102 that should be included in the group, then the light fixture 102 is added to the group (step 312). In other words, in certain example embodiments, the occupancy grouping takes precedence over the visual grouping. Occupancy grouping occurs gradually as more and more occupancy data is collected, sometimes changing and refining the grouping scheme as time goes on and more data is collected, or as space usage changes. Visual groups, however, can be determined at earlier times, with much less data, and are relatively static, which provides a good preliminary grouping scheme while data is still being collected and processed.

The method 300 further includes defining the location of the light fixtures 102 and/or groups of light fixtures 102 (step 314). As mentioned above with respect to FIGS. 1 and 2, the general location of light fixtures 102 can be identified by a mobile device 104 having GPS capabilities. Thus, the light fixtures 102 in the system are identified and their digital identities are tied to their physical locations automatically. Further, the light fixtures 102 have also self-associated with each other in order to provide effective controlling of the lighting system. Because the self-associations are made automatically, in certain example embodiments, the light fixtures continuously self-classify (step 316), and are thus able to adapt to changes in environment and usage.

Figure 4:
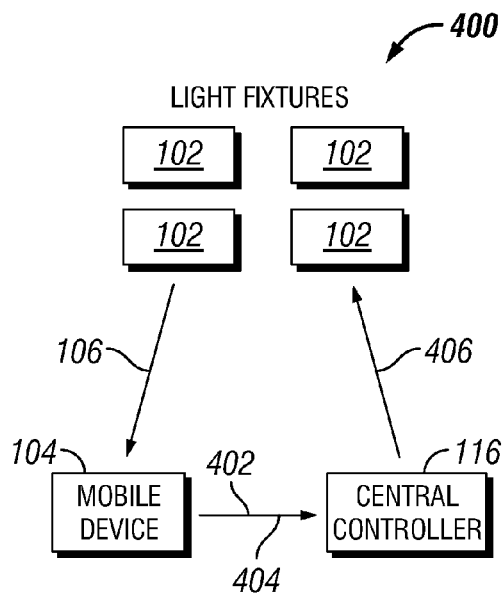
FIG. 4 is a diagrammatical illustration of controlling a group of self-commissioning light fixtures with a mobile device, in accordance with example embodiments of the present disclosure.

The infrastructure of the self-commissioning lighting system 200 also provides a means to remotely and dynamically control a certain group of light fixtures 102 using the mobile device 104. FIG. 4 illustrates a diagram showing such a control network 400 in accordance with an example embodiment of the present disclosure. As discussed above, each light fixture 102 emits a unique light data transmission signal 106, by which the respective transmitting light fixture 102 is digitally identified. A mobile device 104 within a certain optical field of the light fixtures 102 detects, via the ambient light sensor 212, each of the unique light data transmission signals 106 transmitted by the respective light fixtures 102. The mobile device 104 sends information 402 regarding its GPS location as well as the identities of the light fixtures 102 within its visual field to the central controller 116. Thus, the central controller 116 now knows which light fixtures 102 are within the visual field of the mobile device 104 and thus, which light fixture 102 are to be controlled by the mobile device 104. As illustrated in FIG. 1, the central controller 116 is communicatively coupled to both the light fixtures 102 and the mobile device 104. Thus, the central controller 116 also receives command controls 404 from the mobile device 104, which may be set by a user of the mobile device, and sends control signals 406 to the associated light fixtures 102 reflective of the command 404 from the mobile device 104. Thus, the mobile device 104 may be used to control the operation and behavior of the light fixtures 102.

Although the disclosures are described with reference to example embodiments, it should be appreciated by those skilled in the art that various modifications are well within the scope of the disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A self-commissioning lighting system, comprising:
a central controller;
a plurality of light fixtures, each light fixture comprising:
a processor;
a light source coupled to the processor and emitting an optical data signal; and a sensor coupled to the processor and configured to detect another optical data signal emitted by light sources of one or more other light fixtures of the plurality of light fixtures, wherein each optical data signal is distinct; and wherein the central controller is communicatively coupled to the plurality of light fixtures and configured to:

receive, from each light fixture of the plurality of light fixtures, visual data representative of the one or more other light fixtures within a visual field of the respective light fixture;

assign the plurality of light fixtures into one or more visual groups based on the visual data from each light fixture, wherein each visual group includes light fixtures that are within the visual field of each other;

responsive to forming the one or more visual groups, receive occupancy data associated with each light fixture of the plurality of light fixtures, the occupancy data representative of an occupancy in an area associated with the respective light fixture;

assign the plurality of light fixtures into one or more occupancy groups based on the occupancy data of each light fixture, wherein each occupancy group includes light fixtures that experience similar occupancy patterns;

determine whether the one or more visual groups are consistent with the one or more occupancy groups; and responsive to determining that the one or more visual groups are inconsistent with the one or more occupancy groups, modify the grouping of the plurality of light fixtures based on a higher precedence for the occupancy groups than the visual groups.

2. The self-commissioning lighting system of claim 1, wherein the sensor detects the other optical data signal when the one or more other light fixtures associated with the other optical data signal is within the visual field of the light fixture.

3. The self-commissioning lighting system of claim 1, further comprising a remote device communicatively coupled to the central controller, wherein a remote ambient light sensor of the remote device detects the optical data signal from at least one light fixture of the plurality of light fixtures when the at least one light fixture is within the visual field of the remote device.

4. The self-commissioning lighting system of claim 1, wherein the central controller receives the visual data from the light fixture signifying that the one or more other light fixtures are within the visual field of the light fixture.

5. The self-commissioning lighting system of claim 3, wherein the remote device comprises a GPS device, and wherein the central controller receives data from the GPS device signifying the location of the GPS device and if at least one of the fixtures is within the visual field of the GPS device.

6. The self-commissioning lighting system of claim 1, wherein the occupancy data of each light fixture is received from an occupancy sensor of the respective light fixture.

7. The self-commissioning lighting system of claim 1, wherein the plurality of light fixtures are assigned to location groups when they are within a certain physical location.

8. The self-commissioning lighting system of claim 7, wherein light fixtures in the one or more visual groups, the one or more occupancy groups, and/or the location groups are controlled according to the occupancy data, by time, or by an associated device.

9. A system of controlling a self-commissioned lighting system, comprising:

a group of light fixtures, wherein each light fixture in the group of light fixtures emits a unique optical data signal indicative of the digital identity of the emitting light fixture;

a remote control device comprising an ambient light sensor and a GPS device, wherein the ambient light sensor detects the unique optical data signal of a light fixture in the group of light fixtures if the light fixture is within a visual field of the remote control device; and a central controller, wherein the central controller receives a signal from the remote control device, wherein the signal comprises data regarding the GPS location of the remote control device and the digital identity of the light fixture within the visual field of the remote control, wherein the signal further comprises a control command for operation of the light fixture, wherein the central controller sends a control signal to the light fixture implementing the control command, and wherein the central controller is configured to:

receive, from each light fixture of the group of light fixtures, visual data representative of one or more other light fixtures of the group of light fixtures that are within the visual field of the respective light fixture;

assign the group of light fixtures into one or more visual groups based on the visual data of each light fixture, wherein each visual group includes light fixtures that are within the visual field of each other;

responsive to forming the visual groups, receive occupancy data associated with each light fixture of the group of light fixtures;

assign the group of light fixtures into one or more occupancy groups based on the occupancy data of each light fixture, wherein each occupancy group includes light fixtures that experience similar occupancy patterns;

determine whether the one or more visual groups are consistent with the one or more occupancy groups; and responsive to determining that the one or more visual groups are inconsistent with the one or more occupancy groups, modify the grouping of light fixtures based on a higher precedence for the occupancy groups than the visual groups.

10. The system of claim 9, wherein the group of light fixtures comprises a first light fixture and a second light fixture, wherein the first light fixture emits a first optical data signal and the second light fixture emits a second optical data signal distinct from the first optical data signal, wherein the first light fixture detects the second optical data signal when the second light fixture is within the visual field of the first light fixture.

11. The system of claim 9, wherein each unique optical data signal is encoded in a light given off by the respective light fixture.

12. The system of claim 10, wherein the first light fixture comprises:

a first processor communicatively coupled to the central controller;

a first light source coupled to the first processor and emitting the first optical data signal; and a first sensor coupled to the first processor and configured to detect the second optical data signal.

13. The system of claim 10, wherein the ambient light sensor of the remote device detects the first and second optical data signals when the first and second light fixtures are within the visual field of the remote device.

14. A method of self-commissioning a lighting system comprising:

defining a visual group within a system of light fixtures, the system of light fixtures comprising a plurality of light fixtures;

responsive to defining a visual group, defining an occupancy grouping within the system of light fixtures;

determining whether the visual group is consistent with the occupancy grouping; and responsive to determining that the visual group is inconsistent with the occupancy grouping,
ungrouping one or more light fixtures of the system of light fixtures that are not present in the occupancy grouping;
identifying an ungrouped light fixture from the one or more ungrouped light fixtures to be added to the occupancy grouping based on the occupancy data of the ungrouped light fixture; and
adding the ungrouped light fixture to the occupancy grouping.

15. The method of claim 14, wherein the visual grouping is defined by detecting which of the plurality of light fixtures are within a visual field.

16. The method of claim 14, wherein the occupancy grouping is defined by determining which of the plurality of light fixtures have similar or associated usage or occupancy patterns.

17. The method of claim 14, wherein the physical location of each light fixture in the system of light fixtures is defined by communicating the identity of each light fixture to a remote device having GPS capabilities when the remote device is within an optical range, and by associating the GPS location of the remote device with the physical location of each light fixture.

18. The method of claim 14, further comprising controlling the visual grouping, the occupancy grouping, or a group of light fixtures within a certain physical location according to occupancy data, by time, or by an associated device.

19. The method of claim 14, further comprising:
defining a physical location of each light fixture in the system of light fixtures; and
controlling the system of light fixtures according to at least one of a visual grouping, an occupancy grouping, and a group location.

* * * * *